Oct. 30, 1962 W. E. LANG 3,060,696
CABLE LAYING APPARATUS
Filed April 1, 1959
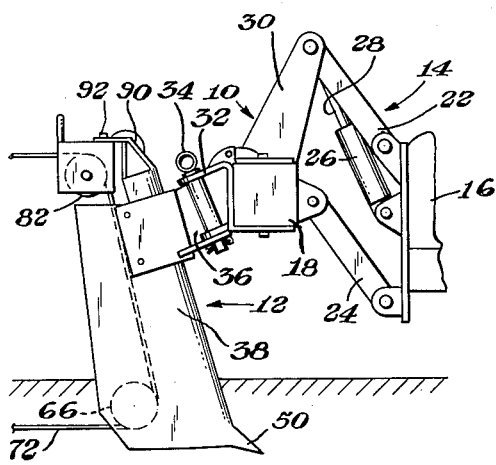
Fig. 1
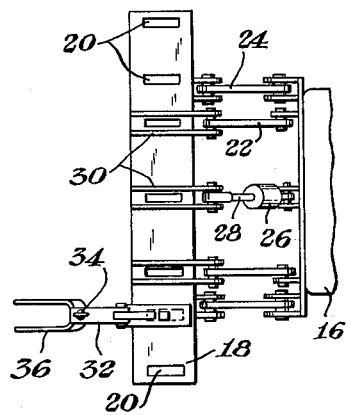
Fig. 2
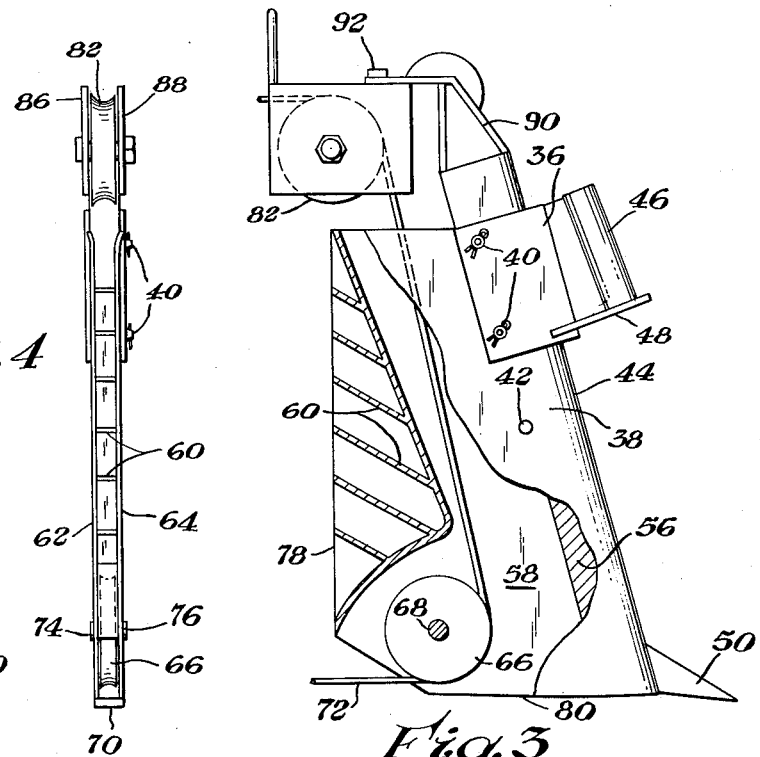
Fig. 4
Fig. 3
Fig. 5
INVENTOR.
William E. Lang
BY Earl D. Ayers
AGENT

United States Patent Office

3,060,696
Patented Oct. 30, 1962

3,060,696
CABLE LAYING APPARATUS
William E. Lang, R.R. 1, Beaverton, Mich.
Filed Apr. 1, 1959, Ser. No. 803,519
5 Claims. (Cl. 61—72.6)

This invention relates to plows and particularly to plows which are adapted for use in sub-surface cable burying operations.

Because of the un-sightliness, cost, and weather effects on communications system cables which are supported on poles, the present trend is towards the use of sub-surface cables in such operations. Also, improvements in reasonably priced cable covering materials which are presently available have made a completely weatherproof cable economically practicable for general usage.

Most cable laying plows which have been widely used are wheeled structures which are drawn behind a prime mover. These plows are, in some respects at least, modifications of the structures of conventional agricultural type plows.

While the above type plows are suitable for cable laying, an inherent disadvantage is that they leave behind the plow a wide opening in the earth which is usually closed by another machine which follows the plow.

In addition, the cable laying rate of prior art plows is relatively slow and, in view of the numbers of the cable laying crew working with the plow (five men being a common number), the slow rate of movement of the plow results in a considerable increase in the overall cost of the cable laying operation.

Accordingly, a principal object of this invention is to provide an improved cable laying plow apparatus.

Another object of this invention is to provide an improved, faster operating cable laying plow.

A further object of this invention is to provide an improved cable laying plow which reduces or minimizes the width of cut made in the earth as cable is plowed into the ground.

In accordance with this invention a cable laying plow has a solid earth dividing section, a hollow cable channel which is the central part of the plow body, and a hollow, reinforced rear part of the plow body. The cable channel includes a sheave coupled to the plow body near the bottom of the plow. An upper sheave is pivotally disposed (for lateral movement) above the cable channel so that a cable passing over the sheave and into the cable channel is aligned with the cable channel as much as is practicable even though the plow may be turning a corner. The plow is coupled to raising and lowering mechanism, usually hydraulic, which is attached to a prime mover and movable with respect thereto. The part of the plow body which divides the earth makes an angle of between 65 degrees and 80 degrees with respect to the horizontal as it is in operation.

The invention, as well as additional objects and advantages thereof, will best be understood when the following detailed description is read in connection with the accompanying drawing, in which:

FIG. 1 is a side elevational view of cable laying apparatus made in accordance with this invention and showing the plow raising and lowering device attached to the rear part of a prime mover;

FIG. 2 is a top view of the plow raising and lowering apparatus shown in FIG. 1;

FIG. 3 is a side elevational view, partly broken away and in section, of a cable laying plow of the type shown in FIG. 1;

FIG. 4 is a rear end view of the plow shown in FIG. 3, broken away to show the reinforcing ribbing of the plow body, and FIG. 5 is a fragmentary side elevational view showing a bore arrangement which is adaptable for changing the angle with respect to the horizontal at which the plow faces the earth during operation.

Referring to FIGURE 1 and FIGURE 2 of the drawing, there is shown cable laying apparatus, indicated generally by the numeral 10. The apparatus 10 comprises a cable laying plow, indicated generally by the numeral 12, and the plow raising and lowering mechanism, indicated generally by the numeral 14. The raising and lowering mechanism 14 is rigidly secured, by any suitable means to the body 16 (shown only as a fragmentary view) of a prime mover such as a tracked vehicle of the so-called caterpillar tractor type. The raising and lowering mechanism illustrated in FIGS. 1 and 2 comprises a heavy bar 18 having a plurality of tool holding slots 20 which is supported with respect to the body 16 of the prime mover by cantilever arms 22, 24 and by means of the hydraulic cylinder 26 which is coupled to the body 16 and its piston 28 which is coupled to one of the fixed arms 30 which extend upwardly from and are secured to the bar 18.

The plow 12 may be coupled to the raising and lowering mechanism 14 at any one of the tool holding slots 20 by means of a coupling bracket 32 which includes a bar engaging and clamping part and a somewhat C shaped rearwardly extending strap having axially aligned bores extending through the side arms of the C to accept a coupling pin 34.

The plow 12 includes usually as a part thereof, a coupling sleeve 36 which may, if desired, be welded or bolted to the body 38 of the plow. Referring now to FIGURE 3 as well as to FIGS. 1 and 2, it may be seen that the sleeve 36 is connected to the plow body 38 by means of pins 40 which extend through bores 42 (only one seen in FIG. 3 as the others are obscured by the sleeve 36) which extend transversely through the body 38. The visible bore 42 may, with the central bore (containing the lower pin 40), be used to couple the sleeve 36 to the body 38 if the plow 12 is to be used to bury cable at somewhat less than the maximum depth at which the plow is otherwise capable of operating. The closer the sleeve 36 is coupled to the top of the plow body 38, the greater the possible working depth of the plow.

The sleeve 36 comprises a plate section of U-shaped transverse cross sectional configuration which fits closely around the leading edge 44 of the plow 12 and against the sides of the body 38. The pins 40 extend through bores (not visible) in the sleeve which are aligned with the bores 42 in the plow body 38. A hollow tubular pin receiving member 46 is joined to the sleeve 36 by means of the bar 48 which is welded both to the sleeve 36 and the pin receiving member 46. The longitudinal axis of the pin receiving member 46 is so disposed that a plane bisecting the thickness of the plow body would pass therethrough. Further, if the longitudinal axis of the member 46 were extended it passes forward (towards the body 16 of the prime mover) of the most forward part of the plow 12 which is usually the solid steel "tooth" 50. Thus, the appearance, of the plow 12 from the side of the bar 18, is that of a trapezoid with the non-parallel sides being the longer.

Referring to FIGS. 3 and 4, the forward or leading part 56 of the plow body 38 is solid metal (steel is commonly used), the central and lower rear part 58 of the body 38 is hollow, and the remainder of the rear part contains reinforcing ribbing 60 to provide strong and constant separation of the side wall plates 62, 64 of the body 38. A sheave 66 is disposed on a shaft 68 within the hollow part 58 with the lower edge of the sheave being only slightly further from the bottom plate 70 of the plow than is necessary to provide clearance for the cable 72 to pass therebetween. The diameter of the sheave 66 is not critical, but should be large enough to provide a reasonable bending radius for the cable 72. The shaft 68 is journalled in bronze bushings 74, 76 in each wall plate 62, 64. The lower rear part of the side plates 62, 64 are cut away from a point on the bottom of the plow slightly to the rear of the shaft 68 to a point at the rear of the plow which is slightly below the shaft 68. Cutting away the above mentioned lower rear part permits the cable to follow turns without scraping on the side plates of the plow.

The rear edge 78 of the plow and the bottom edge 80 of the plow, if extended, would intersect at approximately right angles. The forward or leading edge 44 and the bottom edge 80 intersect at an angle of approximately 75 degrees. The 75 degree angle of intersection has been found to permit the easiest pulling of the plow (the bottom edge 80 being parallel to the mean surface of the ground). The tooth 50, which may be a commercially available ripper tooth of the type used in equipment designed for ripping through frost, is welded to the leading edge 44 at the bottom edge 80 of the plow body. The tooth 50 projects forward and slightly below the plow body 38.

A cable feeding sheave 82, suitably housed between a pair of side plates 86, 88 is disposed over the hollow part 58 of the plow by means of bracket 90 attached to the extended upper end of the solid part 56 of the plow body. The side plate housing of the feeding sheave 82 is rotatably secured to the bracket 90 by means of a bolt 92 which is aligned with the forward rim part of the sheave 82. Thus, on turns the sheave may turn somewhat yet the cable 72 will continue to be fed into the hollow part 58 without scraping against the slightly spread apart upper edges of the side plates 62, 64 of the plow body (see FIG. 4).

The plow shown in FIG. 3 is drawn approximately to scale, and an estimate of dimensions may be made on the basis that the distance from the lower end of the sleeve 36 to the bottom edge of the plow is approximately 36 inches. Although the configuration of the ribbing 60 between the side plates 62, 64 may be varied, the configuration shown is easy to construct and has been found to provide adequate stiffening of the plow body. After the ribbing is installed in the body, a rear edge closing plate (not shown) of the same type as the bottom edge plate 70, is welded to the edges of the side plates 62, 64.

FIG. 5 illustrates an array of bores 94 to which the sleeve 36 may be bolted. The sleeve 36 may be bolted to various combinations of upper and lower bores to change the angle the leading edge 44a makes with respect to the surface of the ground during operation of the plow. It is anticipated that plows made in accordance with this invention may be raised and lowered with other than pantographic types of mechanisms. For example, the blade raising and lowering means of a bulldozer could be reversed and used to raise and lower the plow. However, such a raising and lowering means would move the plow in an arcuate path, thus changing the angle the leading edge 44a makes with respect to the ground with each change in depth of the plow. However, when the plow is to be used to lay cable at a specified depth, the sleeve 36 may be bolted to the plow through the appropriate bores 44a which will give the leading edge of the plow the proper angle at the specified depth.

While the cable laying apparatus has been described as being drawn by a tracked type vehicle, wheeled vehicles having suitable traction may be used.

It should also be pointed out that optimum ease in laying the cable 72 while turning is achieved when the longitudinal axis of the tubular pin receiving member, if extended, makes an acute angle of approximately 11 degrees with respect to an extension of the leading edge 44 of the plow when the plow is connected as shown in FIG. 3 for use with a pantographic acting raising and lowering mechanism.

With the cable laying apparatus as shown in FIG. 1, cable has been consistently laid to a depth of 36 inches with no cable pinching on turns when the apparatus is drawn by a tracked prime mover weighing approximately 16 tons.

What is claimed is:

1. Apparatus for laying cable beneath the surface of a plowable medium, comprising a self propelled prime mover having a longitudinal axis, said prime mover having a powered pantographic raising and lowering mechanism rigidly coupled thereto, a tool carrying bar, said tool carrying bar being coupled to said raising and lowering mechanism in a predetermined axial relationship with respect to the longitudinal axis of said prime mover, a tool coupling bracket, said bracket being rigidly attached to said tool carrying bar, a cable laying plow, said plow having a coupling element rigidly coupled thereto, said coupling element being rotatably coupled to said bracket along a coupling axis, said plow having a rear edge, a bottom edge and a leading edge, the bottom edge of said plow when mounted being substantially parallel with the surface of the medium and the leading edge of the plow defining an angle of between 72 and 78 degrees with respect to said bottom edge, an upward extension of said coupling axis and an upward extension of the axis of said leading edge intersecting at an angle of between 9 and 13 degrees, said last mentioned axes being generally co-planar, means for feeding cable through said cable laying plow and means for actuating said raising and lowering mechanism.

2. Apparatus in accordance with claim 1, wherein said plow has a solid forward part, a hollow central part and a rear part including a rear edge, said central and rear parts having separated side plates, said rear part having ribbing extending between said side plates, said ribbing extending from the upper part of the plow near said rear edge to a point along said rear edge of the plow which lies above the bottom edge of the plow a distance substantially greater than the thickness of said cable, and said means for feeding cable through said plow includes a cable feeding upper sheave which is operatively mounted above said hollow central part and a lower sheave which is disposed on a shaft extending between said side plates in said hollow central part, near the bottom edge of the plow, the diameter of said sheaves being such that cable threaded over and passing between them passes through said hollow central part and passes from said plow between the bottom edge and the ribbing of the rear part of the plow.

3. Apparatus in accordance with claim 2, wherein said cable feeding upper sheave is pivotally mounted above said plow for side to side radial movement about a pivotal axis which, if extended, at least approximately bisects said side plates and passes within the width of approximately one diameter of cable to the peripheral cable bearing surface of said upper sheave.

4. Apparatus in accordance with claim 2, wherein each of said side plates is cut off along a line running from the lowest part of the ribbing at the rear edge of the plow to the bottom edge of the plow, said line being further from the shaft on which said lower sheave is mounted than is any part of said lower sheave.

5. Apparatus in accordance with claim 1, wherein said plow has a forward-extending pointed tooth-like member at the lower end of the leading edge of the plow.

References Cited in the file of this patent

UNITED STATES PATENTS

| | | |
|---|---|---|
| 1,737,314 | Kirby | Nov. 26, 1929 |
| 2,254,324 | Sjogren | Sept. 2, 1941 |
| 2,375,970 | Williams | May 15, 1945 |
| 2,593,679 | Kaupke | Apr. 22, 1952 |
| 2,611,308 | Morkoski | Sept. 23, 1952 |
| 2,931,446 | Gwinn | Apr. 5, 1960 |

FOREIGN PATENTS

| | | |
|---|---|---|
| 1,145,475 | France | May 6, 1957 |
| 937,655 | Germany | Jan. 12, 1956 |